US012083706B2

(12) United States Patent
Thomson

(10) Patent No.: US 12,083,706 B2
(45) Date of Patent: *Sep. 10, 2024

(54) PRECONDITIONED RESIN AGGREGATE

(71) Applicant: CRDC GLOBAL LIMITED, Cork (IE)

(72) Inventor: Donald William Thomson, Heredia (CR)

(73) Assignee: CRDC GLOBAL LIMITED, Cork (IE)

(*) Notice: Subject to any disclaimer, the term of this patent is extended or adjusted under 35 U.S.C. 154(b) by 0 days.

This patent is subject to a terminal disclaimer.

(21) Appl. No.: 18/154,664

(22) Filed: Jan. 13, 2023

(65) Prior Publication Data

US 2023/0405878 A1 Dec. 21, 2023

Related U.S. Application Data

(63) Continuation of application No. 17/285,050, filed as application No. PCT/CA2019/051495 on Oct. 22, 2019, now Pat. No. 11,633,878.

(Continued)

(51) Int. Cl.
*B29B 13/10* (2006.01)
*B29B 9/12* (2006.01)
(Continued)

(52) U.S. Cl.
CPC ........... *B29B 13/10* (2013.01); *B29B 9/12* (2013.01); *B29B 9/16* (2013.01); *C04B 18/026* (2013.01);
(Continued)

(58) Field of Classification Search
CPC . Y02W 30/91; B29B 9/06; B29B 9/12; B29B 9/16; B29B 2009/168;
(Continued)

(56) References Cited

U.S. PATENT DOCUMENTS 5,167,711 A 12/1992 Wichner et al.
5,239,936 A 8/1993 Wichner et al.
(Continued)

FOREIGN PATENT DOCUMENTS

EP 0591895 A2 4/1994
EP 0863114 A1 9/1998
(Continued)

OTHER PUBLICATIONS

Extended European Search Report, for European Application No. 19875500.1-1014, dated Jun. 15, 2022. (8 pages).
International Search Report and Written Opinion for International Application No. PCT/CA2019/051495, mailed Dec. 2, 2019. (9 pages).

*Primary Examiner* — Seyed Masoud Malekzadeh
*Assistant Examiner* — Xinwen Ye
(74) *Attorney, Agent, or Firm* — Seed IP Law Group LLP

(57) ABSTRACT

Systems and methods are provided for making aggregate from comingled waste plastics. For example, there is provided a method of making a preconditioned absorptive resin aggregate, the method including: obtaining a supply of granulated mixed plastic waste treated with a preconditioning agent that comprises at least one of calcium oxide and calcium hydroxide; mixing the supply of granulated mixed plastic waste treated with the calcium oxide preconditioning agent with one or more additives to form a plastic waste mixture, the one or more additives comprising pozzolans; hot extruding the plastic waste mixture to form an extruded product comprising waste plastic material; cooling the extruded product; and processing the extruded product to form an aggregate. Products incorporating such aggregates, such as, for example, lightweight construction blocks, are also provided. Also provided are methods of forming a waste plastics feedstock.

20 Claims, 6 Drawing Sheets

Related U.S. Application Data

(60) Provisional application No. 62/748,989, filed on Oct. 22, 2018.

(51) Int. Cl.
   *B29B 9/16*        (2006.01)
   *B29B 17/04*      (2006.01)
   *C04B 18/02*      (2006.01)
   *C04B 18/20*      (2006.01)

(52) U.S. Cl.
   CPC ........ *C04B 18/20* (2013.01); *B29B 2009/168* (2013.01); *B29B 17/0412* (2013.01); *Y02W 30/91* (2015.05)

(58) Field of Classification Search
   CPC . B29B 17/0412; B29B 13/10; C04B 18/0022; C04B 18/0027; C04B 18/04; C04B 18/20; C04B 18/026; C04B 18/027; C04B 18/022
   See application file for complete search history.

(56) References Cited

U.S. PATENT DOCUMENTS

| | | | |
|---|---|---|---|
| 6,030,572 A | 2/2000 | Berto | |
| 11,633,878 B2* | 4/2023 | Thomson | B29B 7/007 |
| | | | 264/117 |
| 2003/0041782 A1* | 3/2003 | Malloy | B29B 7/90 |
| | | | 106/705 |
| 2012/0007284 A1 | 1/2012 | Nelson et al. | |
| 2012/0077890 A1 | 3/2012 | Mancosh et al. | |
| 2013/0102727 A1 | 4/2013 | LeBlanc | |
| 2017/0088463 A1 | 3/2017 | Alqahtani | |
| 2017/0260093 A1* | 9/2017 | Barrow | B29B 7/007 |
| 2018/0118618 A1 | 5/2018 | Bus | |
| 2019/0337850 A1 | 11/2019 | Ali et al. | |

FOREIGN PATENT DOCUMENTS

| | | |
|---|---|---|
| EP | 1065185 A1 | 1/2001 |
| WO | WO 2016084007 A1 | 6/2016 |
| WO | WO 2016113338 A1 | 7/2016 |

\* cited by examiner

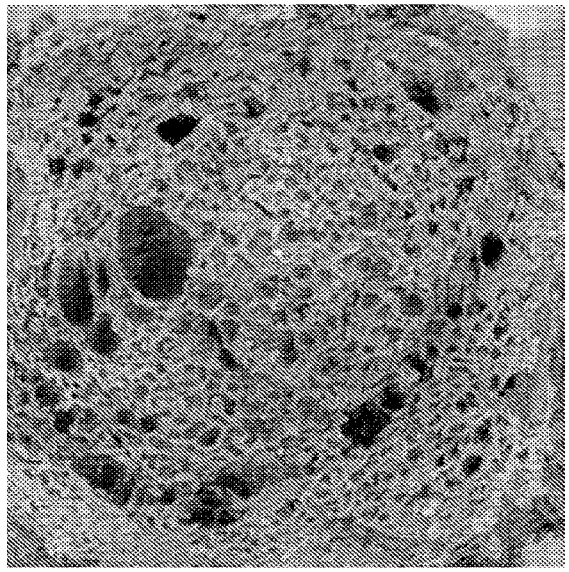
*FIG. 5A*  *FIG. 5B*
| Mesh Size | mm | % Passage |
|---|---|---|
| 3/8" | 9,5 | 100 |
| 1/4" | 6,35 | 96 |
| Nº4 | 4,75 | 75 |
| Nº8 | 2,36 | 19 |
| Nº16 | 1,18 | 4 |
| Nº30 | 0,6 | 1 |
| Nº50 | 0,300 | 0 |
| Nº100 | 0,150 | 0 |
| Nº200 | 0,075 | 0,0 |
*FIG. 6*

PRECONDITIONED RESIN AGGREGATE

CROSS-REFERENCE TO RELATED APPLICATIONS

This application is a continuation of U.S. patent application Ser. No. 17/285,050, filed Apr. 13, 2021, which is a 371 of International Application No. PCT/CA2019/051495, filed Oct. 22, 2019, which claims the benefit of U.S. Provisional Patent Application No. 62/748,989, filed Oct. 22, 2018, the entire disclosure of which is herein incorporated by reference for all purposes.

BACKGROUND

Technical Field

This disclosure generally relates to aggregate particles, and is particularly, but not exclusively, applicable to cementitious compositions for use in the building industry or related industries.

Description of the Related Art

Cementitious building and paving products are well known and are commonly made up of aggregate material and a cementitious or similar type binder and may include such articles as bricks, concrete, paving stones, roofing tiles, blocks, decorative articles, and the like. An undesirable feature which may be associated with such cementitious products is their high density.

Lightweight aggregates are important engineering materials. Together with cement and water, they are used to prepare lightweight aggregate concrete. Lightweight aggregate concrete is a relatively low density material that is finding increasing use in building construction. Lightweight aggregates confer significant engineering benefits.

Lightweight aggregates currently available include manufactured materials such as sintered fly-ash, expanded clay, expanded shale, and foamed slag, as well as naturally occurring geological materials such as scoria and pumice. Such known lightweight aggregates and methods of making and utilizing the same may suffer from a variety of deficiencies or drawbacks. Accordingly, applicant believes improved aggregates and methods of making and utilizing the same are desirable.

Furthermore, only a small percentage of the plastics materials that are set aside for recycling are in fact recycled due to the time and cost of sorting the plastics into their differing types and washing the plastic before each type of plastic can be processed further. As a result, a large percentage of such plastic materials may be placed in landfills or leaked into the environment.

Plastics are one of the fastest growing municipal solid waste components, and there is increasing public demand for recycling. However, plastics are exceedingly difficult to recycle efficiently with available technology. For example, much of the plastic material in municipal wastes is multi-layered, heavily pigmented, contaminated and difficult to sort. The need to separate the various plastic types makes recycling of plastics technically difficult and expensive. Traditional recycling is therefore capable of dealing with just a small portion of the total volume of waste plastic generated by society. Accordingly, applicant believes improved methods and processes of repurposing mixed plastic waste are desirable.

BRIEF SUMMARY

Embodiments described herein provide a lightweight aggregate made in part of mixed plastic waste material, including "tragic" plastic, namely those plastics that have zero value from a traditional recycling perspective. Advantageously, the aggregate may enable the production of lightweight construction products, such as lightweight construction blocks, while simultaneously removing waste plastics from the waste stream, which may otherwise end up in landfills or littering the environment. Such aggregate may be referred to herein as preconditioned absorptive resin aggregate, or PARA™ for short. Such aggregate may also be referred to as preconditioned resin aggregate, or PRA™, for short. Advantageously, embodiments provide for converting commingled plastic waste that has little to no current value into an environmentally and visually benign aggregate that can have multiple applications as a safe and inert, easily transportable, feedstock for multiple applications in various industry sectors, such as, for example, construction, agricultural, road building, and waste to fuel applications. Other embodiments described herein provide a mixed waste plastic feedstock form forming such aggregate.

As an example, one embodiment of a method of making a lightweight aggregate may be summarized as including: obtaining a supply of granulated mixed plastic waste treated with a preconditioning agent comprising, consisting or consisting essentially of calcium oxide (quicklime or burnt lime) and/or calcium hydroxide (slaked lime); mixing the supply of granulated mixed plastic waste treated with the preconditioning agent with one or more additives to form a plastic waste mixture, the one or more additives comprising pozzolans; hot extruding the plastic waste mixture to form an extruded product comprising waste plastic material; cooling the extruded product; and then processing the extruded product to form an aggregate in which the waste plastic material is exposed at exterior surfaces of the aggregate.

The supply of granulated mixed plastic waste may include a variety of plastic materials including high density polyethylene, polypropylene, PVC, ABS, polyurethane, polyamide, and/or PET. The supply of granulated mixed plastic waste may further comprise non-plastic material in the form of food residue, cellulosic material and/or metallic foil material, for example. In some instances, the supply of granulated mixed plastic waste may be characterized by waste plastic having a granule size less than a predetermined maximum granule size obtained by shredding and/or pulverizing mixed plastic waste products. The predetermined maximum granule size may be, for example 25 mm, 20 mm, 15 mm or 10 mm. The supply of granulated mixed plastic waste may have a bulk density that is at least five times greater than a bulk density of the mixed plastic waste products from which the granulated mixed plastic waste is derived, and in some instances may have a bulk density that is at least eight, ten or twelve times greater than a bulk density of the mixed plastic waste products from which the granulated mixed plastic waste is derived.

The supply of granulated mixed plastic waste treated by the preconditioning agent may include about 4% to about 22% calcium compounds by weight, and in some instances may include about 8% to about 18% calcium compounds by weight, about 11% to about 15% calcium compounds by weight, or about 13% calcium compounds by weight. The supply of granulated mixed plastic waste treated by the preconditioning agent may include at least about 50% waste plastic material by weight, at least about 60% waste plastic material by weight, at least about 70% waste plastic material by weight, or at least about 80% waste plastic material by weight, and in some instances, may include between about 75% and about 99% waste plastic material by weight, between about 82% and about 92% waste plastic material by weight, or about 87% waste plastic material by weight.

Prior to the mixing of the supply of granulated mixed plastic waste treated with the preconditioning agent with the one or more additives, at least some calcium oxide of the preconditioning agent in the supply of granulated mixed plastic waste may be converted to calcium hydroxide through exposure to moisture. For example, some calcium oxide of the preconditioning agent may be converted to calcium hydroxide through exposure to moisture in the surrounding environment, moisture in food residues or other moisture sources. The preconditioning agent may act as a disinfectant and/or desiccant. In some instances, the preconditioning agent may sufficiently disinfect the granulated mixed plastic waste such that it does not present a hazardous material concern. The granulated mixed plastic waste treated with the preconditioning agent may be packaged and shipped as a suitable feedstock for subsequent processing, including the formation of aggregate disclosed herein.

The method may further include, prior to the mixing of the supply of granulated mixed plastic waste treated with the preconditioning agent with the one or more additives, blending the supply of granulated mixed plastic waste treated with the preconditioning agent with a supplemental supply of granulated mixed plastic waste from a different source. For example, waste streams from various municipal, industrial, and/or volunteer recovery sources may be blended together.

In some advantageous instances, the pozzolans mixed with the granulated mixed plastic waste treated with the preconditioning agent may comprise burned organic matter residues, such as, for example, sugar cane ash or rice husk ash.

The plastic waste mixture to be hot extruded may include about 2% to about 14% of pozzolans by weight and about 6% to about 18% of calcium compounds (e.g., calcium oxide, calcium hydroxide) by weight, about 4% to about 12% of pozzolans by weight and about 8% to about 16% of calcium compounds by weight, or about 6% to about 10% of pozzolans by weight and about 10% to about 14% of calcium compounds by weight. The plastic waste mixture to be hot extruded may include at least about 50% plastic material by weight, at least about 60% plastic material by weight, at least about 70% plastic material by weight, at least about 70% plastic material by weight, at least about 75% plastic material by weight, or at least about 80% plastic material by weight.

The one or more additives of the plastic waste mixture may further comprise at least one of a dye, an essence, a fire retardant, and an anti-bacterial agent.

The plastic waste mixture may be hot extruded at a processing temperature between about 165° C. and about 230° C., or at other temperature profiles. The plastic waste mixture may have a moisture content sufficient to assist in forming cavities within the extruded product during the hot extruding of the plastic waste mixture. The plastic waste mixture to be hot extruded may consist of or consist essentially of the granulated mixed plastic waste treated with the preconditioning agent and the pozzolans. The preconditioning agent may consist of or consist essentially of calcium oxide (quicklime or burnt lime) and/or calcium hydroxide (slaked lime).

Processing the extruded product to form the aggregate may include crushing and screening the extruded product to meet industry standard sizing requirements for aggregate. This may include crushing and screening the extruded product to form coarse aggregates or fine aggregates.

According to some embodiments, a preconditioned absorptive resin aggregate may be formed by the process of: obtaining a supply of granulated mixed plastic waste treated with a preconditioning agent comprising, consisting or consisting essentially of calcium oxide (quicklime or burnt lime) and/or calcium hydroxide (slaked lime); mixing the supply of granulated mixed plastic waste treated with the preconditioning agent with one or more additives to form a plastic waste mixture, the one or more additives comprising pozzolans; hot extruding the plastic waste mixture to form an extruded product comprising waste plastic material; and processing the extruded product to form an aggregate in which the waste plastic material is exposed at exterior surfaces thereof.

According to some embodiments, a lightweight concrete construction product may be summarized as comprising aggregate formed by the process of: obtaining a supply of granulated mixed plastic waste treated with a preconditioning agent comprising, consisting or consisting essentially of calcium oxide (quicklime or burnt lime) and/or calcium hydroxide (slaked lime); mixing the supply of granulated mixed plastic waste treated with the preconditioning agent with one or more additives to form a plastic waste mixture, the one or more additives comprising pozzolans; hot extruding the plastic waste mixture to form an extruded product comprising waste plastic material; cooling the extruded product; and processing the extruded product to form an aggregate in which the waste plastic material is exposed at exterior surfaces thereof.

According to some embodiments, a method of making a lightweight concrete construction product may be summarized as including: obtaining an aggregate formed by hot extruding a plastic waste mixture comprising comingled mixed plastics, a preconditioning agent comprising, consisting or consisting essentially of calcium oxide (quicklime) and/or calcium hydroxide (slaked lime), and pozzolans, cooling the extruded product, and crushing the extruded product to a desired aggregate size; mixing the aggregate with a sand-cement mixture to form a lightweight concrete mixture; mixing the lightweight concrete mixture with water to generate a lightweight concrete slurry; and forming the lightweight concrete slurry into the lightweight concrete construction product. Forming the lightweight concrete slurry into the lightweight concrete construction product may include, for example, forming the lightweight concrete slurry into a construction block.

According to some embodiments, a method of producing fuel oil may be summarized as: obtaining an aggregate formed by hot extruding a plastic waste mixture comprising comingled mixed plastics, a preconditioning agent comprising, consisting or consisting essentially of calcium oxide (quicklime) and/or calcium hydroxide (slaked lime), and pozzolans, cooling the extruded product, and crushing the extruded to a desired aggregate size; and introducing the aggregate into a pyrolizer to recover fuel oil therefrom.

According to some embodiments, a method of forming a waste plastics feedstock may be summarized as: obtaining a supply of mixed waste plastics; granulating the supply of mixed waste plastics; treating the supply of mixed waste plastics with a conditioning agent that comprises, consists or consists essentially of calcium oxide (quicklime) and/or calcium hydroxide (slaked lime); and, thereafter, packaging the granulated supply of mixed waste plastic that has been treated with the conditioning agent.

BRIEF DESCRIPTION OF THE SEVERAL VIEWS OF THE DRAWINGS

FIGS. 5A and 5B provide enlarged images of an example aggregate particle prepared in accordance with embodiments of the methods of making aggregate disclosed herein.

FIG. 6 provides a granulometry chart of a representative sample of aggregate formed in accordance with embodiments of the present invention.

DETAILED DESCRIPTION

In the following description, certain specific details are set forth in order to provide a thorough understanding of various disclosed embodiments. However, one of ordinary skill in the relevant art will recognize that embodiments may be practiced without one or more of these specific details. In other instances, well-known systems and processes associated with making aggregates or products comprising aggregates may not be shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Embodiments described herein provide a lightweight aggregate made in part of mixed plastic waste material, including "tragic" plastic, namely those plastics that have little to no value from a traditional recycling perspective. Advantageously, the aggregate may enable the production of lightweight construction products, such as lightweight construction blocks, while simultaneously removing waste plastic from the waste stream, which may otherwise end up in landfills or littering the environment. Such aggregate may be referred to as preconditioned absorptive resin aggregate, or PARA™, or as preconditioned resin aggregate, or PRA™. Advantageously, embodiments provide for converting commingled waste plastic that currently has little to no value into an environmentally and visually benign aggregate that can have multiple applications as a safe and inert, easily transportable, feedstock for multiple applications in various industry sectors, such as, for example, construction, agricultural, road building, and waste to fuel applications.

Figure 1:
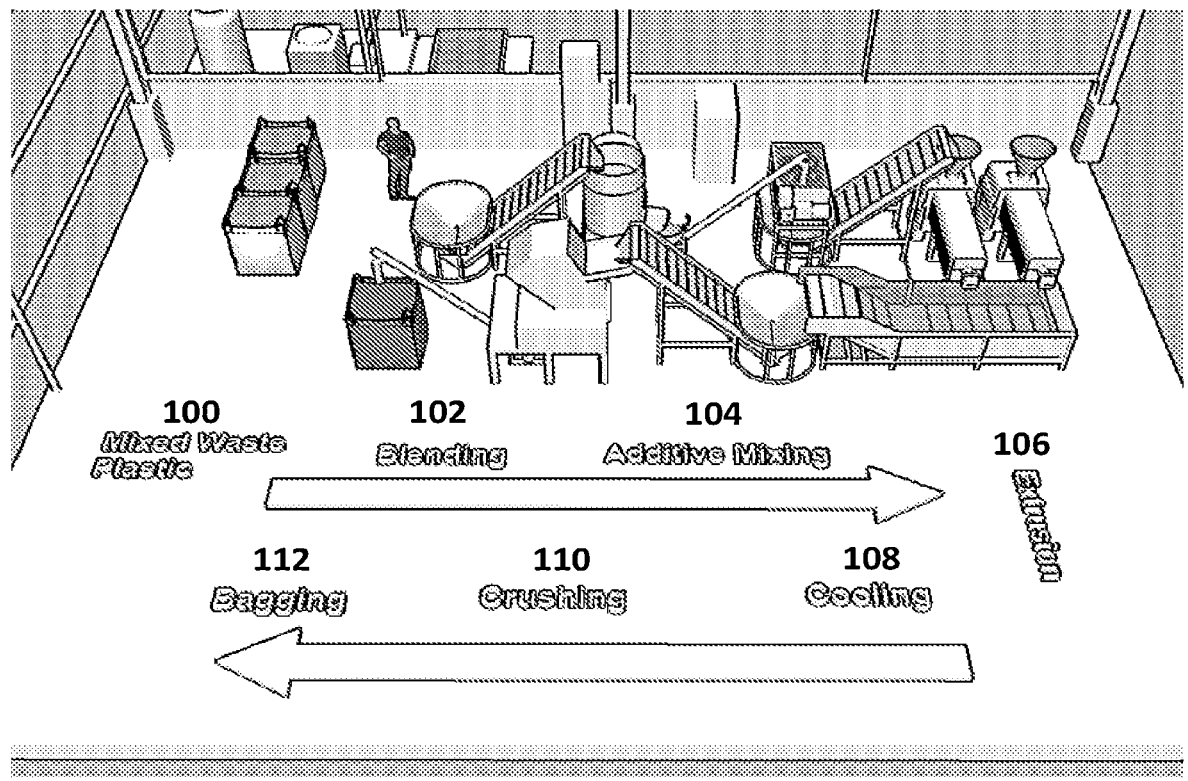
FIG. 1 shows an example embodiment of an aggregate production facility together with a process flow diagram illustrating aspects of the methods of making aggregate disclosed herein.

FIG. 1 shows an example of an aggregate production facility with a process flow diagram illustrating aspects of a method of making a preconditioned absorptive resin aggregate according to an example embodiment.

The method may begin at 100 with obtaining a supply of granulated mixed plastic waste treated with a preconditioning agent that comprises, consists or consists essentially of calcium oxide (quicklime or burnt lime) and/or calcium hydroxide (slaked lime). For example, containers of granulated mixed plastic waste treated with the preconditioning agent may be received from one or more waste sources. The waste sources may include, for example, industrial, municipal, and volunteer recovery sources. Advantageously, waste plastics of various types may be collected and comingled with little to no regard to the specific type of plastic materials collected.

To facilitate the methods of making aggregate disclosed herein, comingled waste plastic products (e.g., plastic containers) are preferably ground, shredded, pulverized or otherwise processed to form a granulated mixed plastic waste. In addition, the granulated mixed plastic waste may be advantageously treated with a preconditioning agent comprising, consisting, or consisting essentially of calcium oxide (CaO), commonly known as quicklime or burnt lime, and/or calcium hydroxide ($Ca(OH)_2$), commonly known as slaked lime. This preconditioning agent may act, for example, as a disinfectant and provide a "dry-cleaning" effect to improve sanitation of the granulated mixed plastic waste and reduce foul odors. The preconditioning agent may also act as a desiccant and absorb moisture beneficial to the methods disclosed herein. In some instances, the preconditioning agent may sufficiently disinfect the granulated mixed plastic waste such that it does not present a hazardous material concern. The granulated mixed plastic waste treated with the preconditioning agent may be packaged and shipped as a suitable feedstock for subsequent processing, including the formation of aggregate disclosed herein.

In some instances, it is appreciated that processing systems may be provided at or near recovery collection sites or facilities to minimize the transport of mixed plastic waste products prior to granulation and treatment with the preconditioning agent. In this manner, granulated mixed plastic waste may be transported in a more compact and relatively cleaner form factor for subsequent processing in accordance with embodiments of the methods disclosed herein. Because the preconditioning with calcium oxide and/or calcium hydroxide can help reduce any potential pathogens and eliminate associated odors, it can make backhauling of the granulated mixed plastic waste material much more efficient and environmentally healthy.

The supply of granulated mixed plastic waste may include a variety of plastic materials including high density polyethylene, polypropylene, PVC, ABS, polyurethane, polyamide, and/or PET. The supply of granulated mixed plastic waste may further comprise non-plastic material in the form of food residue, cellulosic material and/or metallic foil material, for example. In some instances, the supply of granulated mixed plastic waste may be characterized by waste plastic having a granule size less than a predetermined maximum granule size obtained by shredding and/or pulverizing mixed plastic waste products. The predetermined maximum granule size may be, for example, 25 mm, 20 mm, 15 mm or 10 mm. The supply of granulated mixed plastic waste may have a bulk density that is at least five times greater than a bulk density of the mixed plastic waste products from which the granulated mixed plastic waste is derived, and in some instances may have a bulk density that is at least eight, ten or twelve times greater than a bulk density of the mixed plastic waste products from which the granulated mixed plastic waste is derived. The supply of granulated mixed plastic waste may comprise unwashed and/or unsorted plastics.

The supply of granulated mixed plastic waste treated by the preconditioning agent may include about 4% to about 22% calcium compounds by weight, and in some instances may include about 8% to about 18% calcium compounds by weight, about 11% to about 15% calcium compounds by weight, or about 13% calcium compounds by weight. The supply of granulated mixed plastic waste treated by the preconditioning agent may include at least about 50% waste plastic material by weight, at least about 60% waste plastic material by weight, at least about 70% waste plastic material by weight, or at least about 80% waste plastic material by weight, and in some instances, may include between about 75% and about 99% waste plastic material by weight, between about 82% and about 92% waste plastic material by weight, or about 87% waste plastic material by weight.

Prior to the mixing of the supply of granulated mixed plastic waste treated with the preconditioning agent with the one or more additives, at least some calcium oxide of the preconditioning agent in the supply of granulated mixed plastic waste may be converted to calcium hydroxide through exposure to moisture. For example, some calcium oxide of the preconditioning agent may be converted to calcium hydroxide through exposure to moisture in the surrounding environment, moisture in food residues or other moisture sources. Again, the preconditioning agent may act as a disinfectant and/or a desiccant.

After obtaining the supply of granulated mixed plastic waste treated with the preconditioning agent, the method may in some embodiments continue at 102 with blending the supply of granulated mixed plastic waste with one or more other supplemental sources of granulated mixed plastic waste which may be similarly treated with a preconditioning agent that comprises, consists or consists essentially of calcium oxide and/or calcium hydroxide. For example, a stream of granulated mixed plastic waste from industrial sources may be blended with a stream of granulated mixed plastic waste from municipal sources and/or volunteer recovery sources.

The method may then continue at 104 with mixing the supply (or blended supplies) of granulated mixed plastic waste treated with the preconditioning agent with one or more additives to form a plastic waste mixture. Advantageously, the one or more additives may comprise, consist or consist essentially of pozzolans. Pozzolans include finely divided materials comprising $SiO_2$ and/or $Al_2O_3$, which react with calcium hydroxide to form compounds having cementitious properties. Pozzolans embrace a large number of materials which vary widely in terms of origin, composition and properties. Both natural and artificial materials show pozzolanic activity and may be used as supplementary cementitious materials. Commonly used pozzolans include industrial by-products such as fly ash, silica fume from silicon smelting, highly reactive metakaolin, and burned organic matter residues rich in silica such as volcanic ash and rice husk ash. In some particularly advantageous embodiments, the pozzolans mixed with the granulated mixed plastic waste treated with the preconditioning agent may comprise burned organic matter residues, such as, for example, sugar cane ash or rice husk ash. The one or more additives of the plastic waste mixture may further comprise an essence, a fire retardant, and/or an anti-bacterial agent.

The method may continue at 106 with hot extruding the plastic waste mixture to form an extruded product comprising waste plastic material, followed by cooling the extruded product at 108 (such as via a water bath).

The plastic waste mixture to be hot extruded may include about 2% to about 14% of pozzolans by weight and about 6% to about 18% of calcium compounds (e.g., calcium oxide, calcium hydroxide) by weight, about 4% to about 12% of pozzolans by weight and about 8% to about 16% of calcium compounds by weight, or about 6% to about 10% of pozzolans by weight and about 10% to about 14% of calcium compounds by weight. The plastic waste mixture to be hot extruded may include at least about 50% plastic material by weight, at least about 60% plastic material by weight, at least about 70% plastic material by weight, at least about 75% plastic material by weight, or at least about 80% plastic material by weight. The plastic waste mixture may be hot extruded at a processing temperature between about 165° C. and about 230° C. or at other temperature profiles. The plastic waste mixture to be hot extruded may consist or consist essentially of the granulated mixed plastic waste treated with the preconditioning agent and the pozzolans. The plastic waste mixture may have a moisture content sufficient to assist in forming internal voids or cavities within the extruded product during the hot extruding of the plastic waste mixture as the moisture is vaporized during the hot extruding process.

For example, the extrusion process may be designed to use the moisture content developed by the desiccant effect of the preconditioning agent in the granulated mixed plastic waste feedstock as a blowing or foaming agent that vaporizes within the extrusion chamber to create an internal open-cell matrix of microbubbles in the extruded product, which may provide additional advantages in the resulting aggregate as discussed elsewhere.

The extrusion process may also provide another phase of waste decontamination and sanitization in which bacteria and viruses are eliminated and organic material denatured, the resulting product being a sanitized environmentally inert hybrid of plastic resin and calcium.

Next, at 110, the method may continue with processing the extruded product to form an aggregate in which the waste plastic material is exposed at exterior surfaces of the aggregate, and in which internal non-plastic additives are similarly exposed. Processing the extruded product to form the aggregate may include crushing and screening the extruded product to meet industry standard sizing requirements for traditional aggregates. This may include crushing and screening the extruded product to form fine aggregates (most particles smaller than 5 mm) or coarse aggregates (particles predominantly larger than 5 mm (0.2 in.) and generally between 9.5 mm and 37.5 mm (3/8 in. and 1½ in.)). An example of aggregate size distribution of a representative sample of aggregate formed in accordance with embodiments of the methods disclosed herein is provided in FIG. 6.

Advantageously, processing the extruded product may result in exposing the non-plastic additive particles in the extruded product to facilitate, for example, chemical adhesion and cohesion of the aggregate to surrounding material when incorporating the aggregate in a cement product for example. In addition, processing the extruded product may advantageously result in exposing internal microbubble structures which may physically attract moisture in a cement mix, for example, in a process known as wetting. As such, aggregates made according to embodiments of the present invention may become absorptive. The sponge-like open cell physical characteristics of the crushed aggregate may pull the wet cement mix into the aggregate particles and facilitate a structure promoting mechanical cohesion. The ability to produce an absorptive open cell aggregate particle that transports additives (e.g., calcium oxide and pozzolans) to enhance chemical cohesion and comprises an absorptive physical structure to enhance mechanical fastening is believed to be particularly advantageous. Still further, fibrous extensions may be formed during processing (e.g., crushing, grinding, fracturing) of the extruded product, which fibrous extensions may assist in binding the aggregate to surrounding material when incorporating the aggregate in a cement product for example, and in strengthening the resulting product. The fibrous extensions may act similar to fiber additives used in some concrete products and result in increased strength and/or durability.

With continued reference to FIG. 1, the method may conclude at 112 with packaging (e.g., bagging) the aggregate for storage or transport. Alternatively, the resulting aggregate may be put to immediate use as a component of a lightweight cement product, such as a lightweight cement construction block (including structural construction blocks), or as a feedstock in an industrial process for recovering fuel oil from the aggregate, for example.

Accordingly, mixed plastic waste may be converted and permanently fixed within construction materials, thereby eliminating associated environmental impacts of such waste and creating a second use value stream for the waste. Put another way, a mixed-polymer concrete aggregate may be formed by utilizing "dirty" or unmanaged plastic recovered from industrial, commercial and domestic sources and may effectively sequester such waste in concrete building blocks or other concrete products.

In view of the above, it will be appreciated that according to some embodiments, a preconditioned absorptive resin aggregate may be formed by the process of: obtaining a supply of granulated mixed plastic waste treated with a preconditioning agent that comprises, consists or consists essentially of calcium oxide and/or calcium hydroxide; mixing the supply of granulated mixed plastic waste treated with the preconditioning agent with one or more additives to form a plastic waste mixture, the one or more additives comprising pozzolans; hot extruding the plastic waste mixture to form an extruded product comprising waste plastic material; cooling the extruded product; and processing the extruded product to form an aggregate in which the waste plastic material is exposed at exterior surfaces thereof.

In addition, it will be appreciated that according to some embodiments, a lightweight concrete construction product may be summarized as comprising aggregate formed by the process of: obtaining a supply of granulated mixed plastic waste treated with a preconditioning agent that comprises, consists or consists essentially of calcium oxide and/or calcium hydroxide; mixing the supply of granulated mixed plastic waste treated with the preconditioning agent with one or more additives to form a plastic waste mixture, the one or more additives comprising pozzolans; hot extruding the plastic waste mixture to form an extruded product comprising waste plastic material; cooling the extruded product; and processing the extruded product to form an aggregate in which the waste plastic material is exposed at exterior surfaces thereof.

Still further, it will be appreciated that according to some embodiments, a method of making a lightweight concrete construction product may be summarized as including: obtaining an aggregate formed by hot extruding a plastic waste mixture comprising comingled mixed plastics, a preconditioning agent that comprises, consists or consists essentially of calcium oxide and/or calcium hydroxide, and pozzolans, cooling the extruded product, and crushing the extruded product to a desired aggregate size; mixing the aggregate with a sand-cement mixture to form a lightweight concrete mixture; mixing the lightweight concrete mixture with water to generate a lightweight concrete slurry; and forming the lightweight concrete slurry into the lightweight concrete construction product. Forming the lightweight concrete slurry into the lightweight concrete construction product may include forming the lightweight concrete slurry into a construction block. Incorporating regenerated plastic particles combined with a standard sand-cement mixture can result in highly resistant, durable blocks while providing a viable up-cycling usage of the plastic waste material. According to some embodiments, such blocks may comprise or contain between about 200 grams and about 500 grams of waste plastic material, and may result in a weight reduction of about 3% to about 5% in total weight compared to conventional concrete blocks.

Yet still further, it will be appreciated that according to some embodiments, a method of producing fuel oil may be summarized as including: obtaining an aggregate formed by hot extruding a plastic waste mixture comprising comingled mixed plastics, a preconditioning agent that comprises, consists or consists essentially of calcium oxide and/or calcium hydroxide, and pozzolans, cooling the extruded product, and crushing the extruded to a desired aggregate size; and introducing the aggregate into a pyrolizer to recover fuel oil therefrom.

Yet still further, it will be appreciated that according to some embodiments, a method of forming a waste plastics feedstock may be summarized as: obtaining a supply of mixed waste plastics; granulating the supply of mixed waste plastics; treating the supply of mixed waste plastics with a conditioning agent that comprises, consists or consists essentially of calcium oxide and/or calcium hydroxide; and, thereafter, packaging the granulated supply of mixed waste plastic that has been treated with the conditioning agent.

Figure 2A:
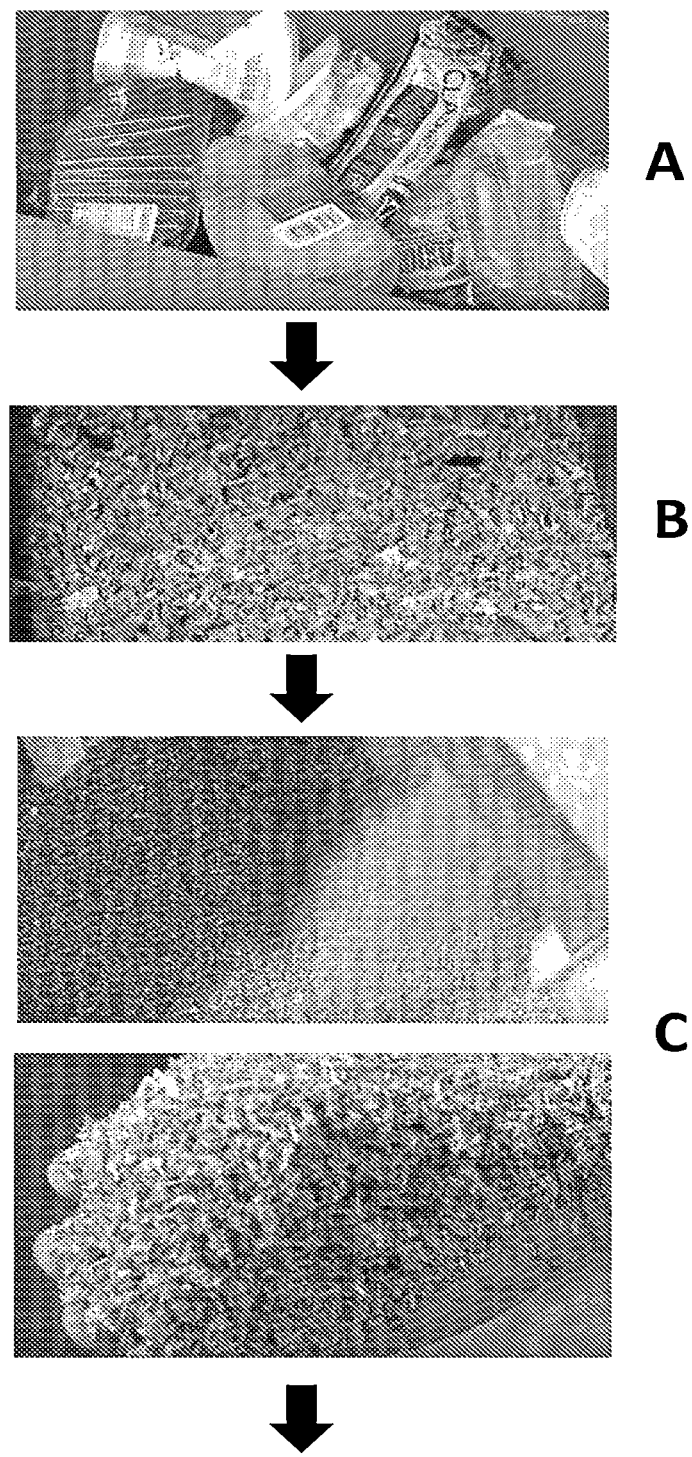
FIGS. 2A and 2B show a process flow diagram illustrating aspects of methods of forming a concrete product with aggregate made according to embodiments of the present invention.
Figure 2B:
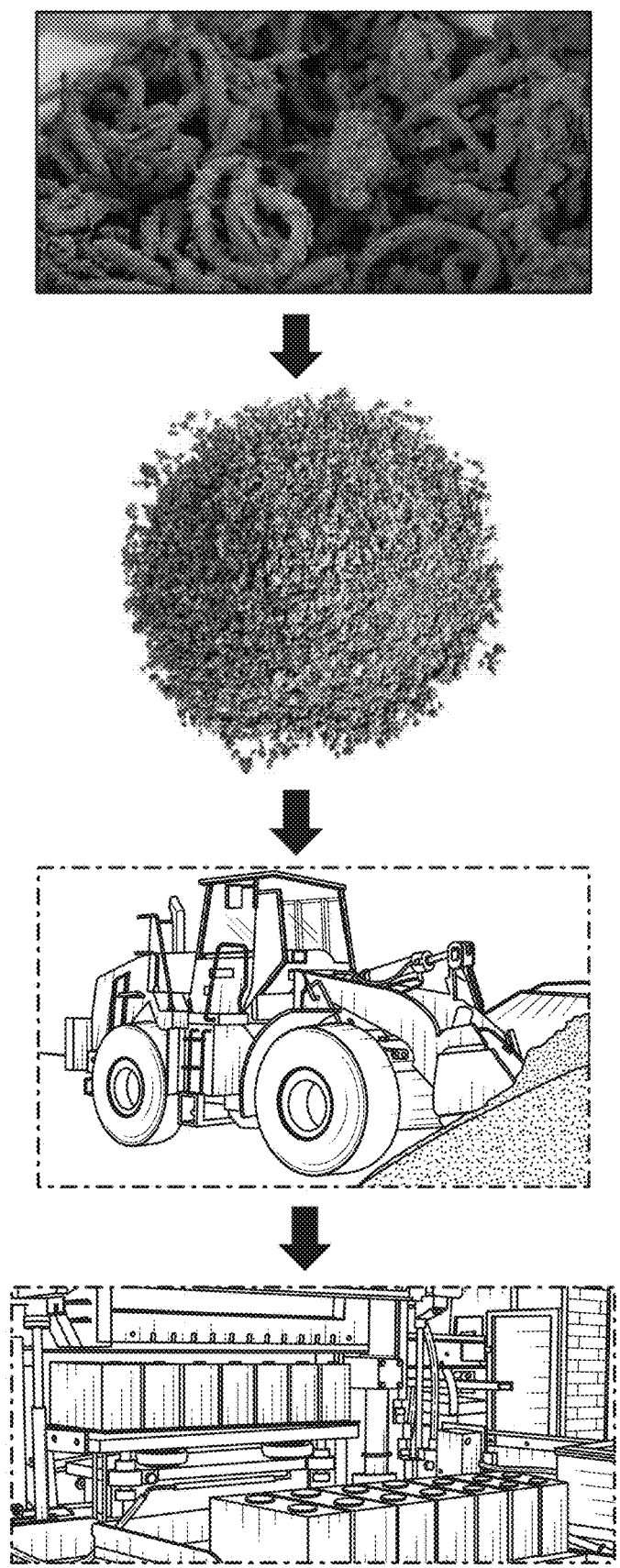

FIGS. 2A and 2B show a process flow diagram illustrating aspects of methods of forming a construction product with aggregate made according to embodiments of the present invention.

At step A, mixed waste plastic products are collected. The mixed plastic waste products may include a variety of plastic materials, food residue, and non-plastic label components.

At step B, the mixed plastic waste products are processed (e.g., ground and/or shredded) to form granulated mixed plastic waste and a preconditioning agent comprising, consisting or consisting essentially of calcium oxide and/or calcium hydroxide may be introduced.

At step C, the supply of granulated mixed plastic waste treated with the preconditioning agent is mixed with one or more additives to form a plastic waste mixture. Advantageously, the additives may comprise, consist or consist essentially of pozzolans.

At step D, the plastic waste mixture is subjected to a hot extrusion process to form an extruded product comprising waste plastic material.

Then, at step E, the extruded product is processed (e.g., ground and screened) to form an aggregate in which the waste plastic material and additives therein are exposed at exterior surfaces.

At step F, the aggregate may be stored in a manner similar to conventional aggregates for subsequent use.

For example, at step G, aggregate may be combined with a sand-cement mixture to form a lightweight concrete mixture, the lightweight concrete mixture may then be mixed with water to generate a lightweight concrete slurry, and the lightweight concrete slurry may then be formed into a lightweight concrete construction product, such as, for example, a lightweight concrete block.

Figure 3:
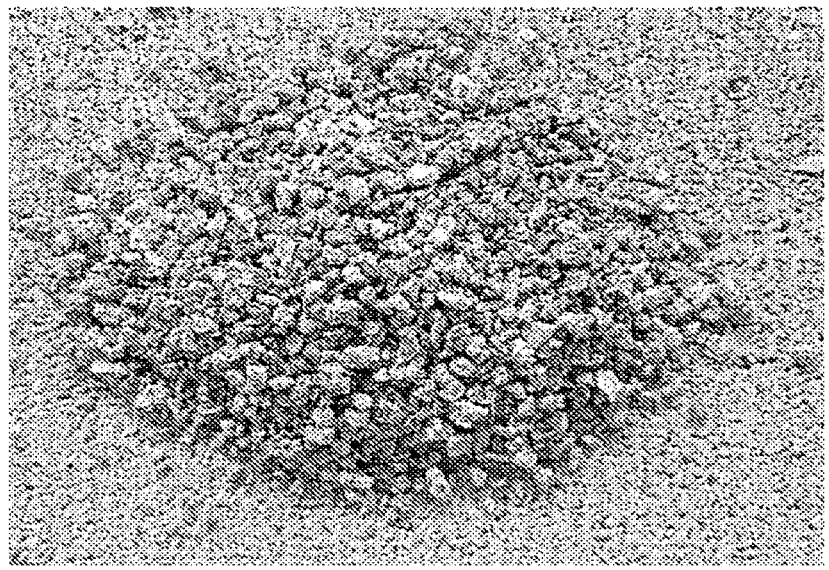
FIG. 3 shows example aggregate prepared in accordance with embodiments of the methods of making aggregate disclosed herein.

FIG. 3 shows example aggregate prepared in accordance with embodiments of the methods of making aggregate disclosed herein. The aggregate is shown on top of a light weight concrete block formed with the aggregate for comparison. As can be appreciated from FIG. 3, the aggregate presents a visually benign product with irregular surfaces that promote bonding when incorporated in a concrete product.

Figure 4:
FIG. 4 shows example aggregate prepared in accordance with embodiments of the methods of making aggregate disclosed herein in which the aggregate is shown deposited on the ground to illustrate visual characteristics thereof relative to the surrounding environment.

FIG. 4 shows another example aggregate prepared in accordance with embodiments of the methods of making aggregate disclosed herein. The aggregate is deposited on the ground to illustrate visual characteristics of the aggregate relative to the surrounding environment. Again, it can be appreciated that the aggregate presents a visually benign product with irregular surfaces that promote bonding when incorporated in a concrete product. In can also be seen that the aggregate has a porous structure, which further assists in binding the aggregate in a concrete product.

FIG. 5 provide enlarged images of example aggregate prepared in accordance with embodiments of the methods of making aggregate disclosed herein to further illustrate characteristics of the aggregate, including, in particular, the irregularity of the surface structure and porous nature of the aggregate. In addition, fibrous extensions of the aggregate are visible in FIG. 5B.

One problem with discarded plastic waste is that it is a visual contaminant. For humans, this creates a visceral response when encountering waste in natural environments like shorelines. For animals, discarded plastic waste may be mistaken for a food source and is therefore potentially deadly. In construction, colored flecks or particles of plastic in building materials may create concern over strength and quality. As such, providing an aggregate from waste plastics which is characterized by neutral grey tones and is visually benign is seen as one significant benefit of the aggregates disclosed herein. While embodiments of the methods disclosed herein generally result in aggregates with neutral grey tones, it is appreciated that in some embodiments, one or more dyes or other fillers may be utilized to adjust coloration of the resulting aggregate, preferably to resemble the color or colors of natural occurring aggregates used in the construction industry.

Notably, embodiments of the present invention provide an aggregate comprising mixed waste plastic, calcium oxide and/or calcium hydroxide, and pozzolans (e.g., sugar cane ash, rice husk ash, incinerated paper products) for use in cement products, including structural cement products. The pozzolans play a role in the chemical adhesion of cement to the aggregate. There is also the potential of the calcium oxide and/or calcium hydroxide to interact with the pozzolans to create a pozzolanic reaction internally within the mixture matrix. In addition, calcium oxide will convert to calcium hydroxide when it is exposed to moisture and has the potential to absorb carbon dioxide out of the air to create calcium carbonate or limestone, in a hardening process known as carbonation. As such, the additives (e.g., calcium oxide, calcium hydroxide, pozzolans) provide for conditions within the aggregate to promote both chemical adhesion and cohesion to cement using combined processes of hydraulic, pozzolanic and carbonation reactions. It has been found that the additives (e.g., calcium oxide, calcium hydroxide, pozzolans) play an important role in the "homogenizing" of the commingled mixed plastic resin during the extrusion process which may be due to the hard particle composition assisting in the effective mixing of the various melted polymer chains present in the extruding process.

Apart from the cementitious benefits of using aspects of the lime cycle in embodiments of the present invention, the preconditioning agent acts as a disinfectant of organic matter and an anhydrous desiccant so the addition at the point of recovery, the waste facility or pickup location, has additional public health benefits of killing pathogens and eliminating odors. The strong desiccant behavior of both the preconditioning agent and pozzolans pulls humidity from the air to help the additives slightly moisten and evenly cover the granulated mixed plastic waste particles. This coverage of the granulated mixed plastic waste particles with the additives also has the added benefit and effect of further densifying the lightweight particles and making them easier to feed into machinery during the extruding process.

Advantageously, shredding or crushing of the mixed plastic waste at the recovery location can assist in "dry-cleaning" the waste. The shredding machines may be provided in the form of rotary knives or rolling crushing drums and may aggressively mechanically cut and/or crush the mixed plastic waste into particles, preferably to a size of 25 mm or less, 20 mm or less, 15 mm or less, or 10 mm or less. This aggressive mechanical action can effectively knock off any debris, sand, plant matter, dried food, etc. and can produce a much cleaner bulk waste material. Thus, before the preconditioning agent is mixed in following this initial mechanical agitation, the granulated mixed plastic waste is already much cleaner than the original waste feedstock. This is advantageous in that in this "dry-cleaning" process eliminates the use of water to clean the feedstock which provides both environmental and financial benefits to the recovery location.

Another advantage of embodiments of the present invention is the ability to process PVC waste in addition to other plastic materials. PVC can be difficult to deal with in standard recycling process as it often mistaken for PET and can contaminate the recyclability of PET as it blackens at very low temperatures and has a yellowing effect on the PET if commingled therewith. Unlike other thermoplastics which are essentially hydrocarbon chains, PVC is made up of a large proportion of chlorine which dehydrochlorinates at elevated temperatures releasing toxic HCl gas. PVC has good ultraviolet properties and a very low flammability, characteristics that make it a preferred plastic material in the construction industry. Therefore in the production of aggregates according to embodiments described herein, PVC represents a valuable feedstock. The tendency for PVC to blacken or darken is considered an advantage when producing desired color tones to camouflage and color the aggregate to make it visually benign and/or to capture the same tones of the cement products that may be produced with the aggregate. It has been found that commingled mixed waste plastic naturally provides a light to dark grey tone when extruded together but can be modulated by a couple of factors such as processing time and temperature (the longer the processing time and higher the temperature, the darker the resulting aggregate), as well as the proportion of PVC in the feedstock. Therefore, in some embodiments, PVC may be used as a tinting agent to achieve a desired color tone of the resulting aggregate.

As previously discussed, aggregate formed in accordance with embodiments of the present invention can be used in other industries besides the construction industry, such as, for example, a preconditioned feedstock for waste to energy programs like pyrolysis. PVC can pose certain problems for processing in pyrolysis because of it HCl off-gassing as pyrolysis of plastic generally happens at the 300-500° C. temperature range. Current research indicates that calcium oxide, calcium hydroxide and calcium carbonate all act as HCl gas absorbers by creating a calcium chloride salt which can be an effective soil enhancer and stabilizer. As such, the aggregates described herein may be of interest to the petrochemical industry as the calcium to "scrub" HCl out of high-temperature pyrolysis methods may be present in the aggregates. The potential benefits include that the aggregates produced in accordance with embodiments of the present invention are environmentally benign and safe to ship and store.

Figure 7:
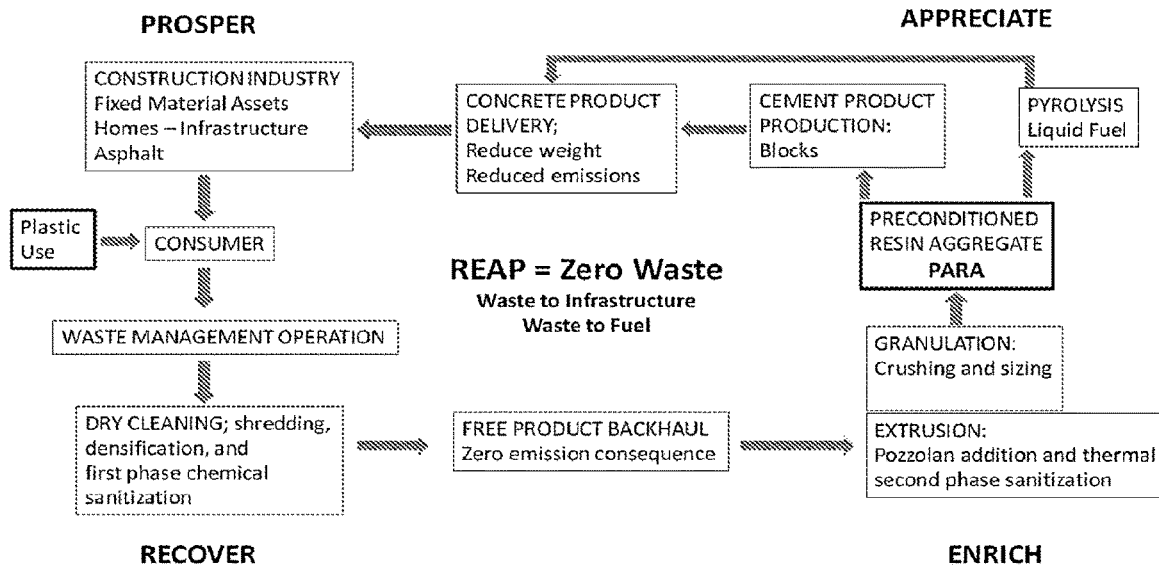
FIG. 7 provides a diagram illustrating the circularity associated with recovering waste products and enriching or repurposing material thereof for beneficial use in construction materials or as a source of fuel, for example.

FIG. 7 provides a diagram illustrating the circularity associated with recovering waste products and enriching or repurposing the waste material for beneficial use in construction materials or as a source of fuel, for example. This is one example of what applicant refers to as the REAP™ approach, REAP being an acronym for Recover-Enrich-Appreciate-Prosper.

By volume, the global construction aggregate industry is one of the largest commodities markets that exist, trailing only behind water consumption, and therefore it is a great industry to absorb preconditioned absorptive resin aggregate produced according to the methods described herein. This exemplifies the concepts of the circular economy in that the waste stream of one industry can become the value stream of the next. Because of its highly cohesive properties, preconditioned absorptive resin aggregate produced according to the methods described herein can be used in all aspects of concrete construction but with the added benefit of providing lighter elements and therefore reducing structural loads. The preconditioned absorptive resin aggregate may be considered a hybrid between plastic and limestone which has better insulative and acoustic properties than conventional construction aggregate and the carbon footprint relative to material transportation is also decreased. The ability to use a relatively low temperature and energy methodology to convert waste plastic into a new manufactured lightweight aggregate may open a whole new "Waste to Infrastructure" approach to the responsible end of life use of plastic, specifically single-use packaging. Using the waste stream of the plastic industry and converting it into the value stream of the construction industry fixes the carbon and provides products that increase in value with time and a zero waste approach to improved plastic management techniques. This exemplifies the REAP approach.

Figure 8:
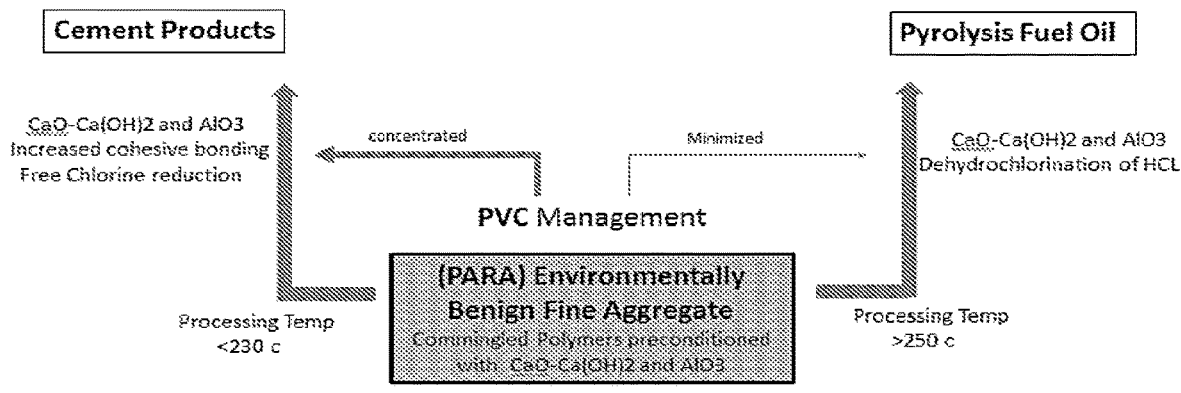
FIG. 8 provides a diagram illustrating some beneficial aspects associated with example applications of the aggregate disclosed herein.

FIG. 8 provides a diagram illustrating some beneficial aspects associated with the preconditioned absorptive aggregate disclosed herein, including use of such aggregate in cement products and in pyrolysis fuel oil applications.

Advantageously, chemicals contained in the preconditioned absorptive resin aggregate produced by embodiments of the methods described herein provide notable benefits when used as a lightweight aggregate in cement products or when as a stable feedstock for liquid fuel pyrolysis. The combination of commingled plastics with the preconditioning agent, the pozzolans and potentially aluminum oxide (from the oxidation of the foil present in metallic laminated packaging) are beneficial and functional in both of these applications.

As previously discussed, the preconditioning agent plays an initial role as a disinfectant but evolves into an additive for the cohesion of the cement to the preconditioned absorptive resin aggregate. Shredded and oxidized aluminum foil may generate aluminum oxide and play a similar role in improving cohesion and can have the effect of strengthening the concrete and reducing corrosivity from any free chlorine that may be present in the concrete mix.

When the preconditioned absorptive resin aggregate is used as a preconditioned feedstock for liquid fuel pyrolysis, dehydrochlorination of any PVC present will begin at temperatures above 230-250° C. vaporizing out HCl. Both calcium oxide and calcium hydroxide and metal oxides like aluminum oxide are known absorbers of HCl and therefore play the role of reducing the HCL in harmless chloride salts like calcium chloride.

As such, there is a convenient crossover of benefit between the two example industrial applications the environmentally benign preconditioned absorptive resin aggregate of embodiments of the present invention can be used for, namely, a concrete product aggregate and a feedstock for liquid fuel pyrolysis.

The absorptive open cell structure of the preconditioned absorptive resin aggregate of embodiments of the present invention can also play an important role in both applications. For example, the increased surface area provided by the foaming of the aggregate is beneficial in the mechanical adhesion between the cement and the aggregate in the case of use as a concrete product aggregate. The absorptive open cell structure also provides a capillary action when used as a concrete product additive effectively pulling the cement mixture into the cell structure of the aggregate. In the case of liquid fuel pyrolysis, the increased surface area may provide better and more efficient heating and therefore gasification of the aggregate in the pyrolysis reactor. The open cell structure also allows for the complete evacuation of oxygen during the pyrolysis phase.

Providing such an environmentally benign resin aggregate that can be safely and efficiently transported and that exhibits such unique industrial crossover characteristics could lead to a waste management paradigm shift and the effective recovery and repurposing of mixed plastic wastes, including "tragic" plastics, which are unnecessarily filling landfills and fouling the environment.

Although the systems and methods described herein are often discussed in the context of producing aggregates for use in concrete products or as a feedstock for liquid fuel pyrolysis, it is appreciated that such aggregates and related waste plastics feedstock may be used for a wide variety of other purposes.

Moreover, aspects and features of the various embodiments described above may be combined to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

This application claims the benefit of priority to U.S. Provisional Application No. 62/748,989, filed Oct. 22, 2018, which application is hereby incorporated by reference in its entirety.

The invention claimed is:

1. A method of making particles, the method comprising:
obtaining a supply of plastic waste treated with a preconditioning agent that comprises at least one of calcium oxide and calcium hydroxide to improve sanitation of the granulated mixed plastic waste;
mixing the supply of plastic waste treated with the preconditioning agent with one or more additives to form a plastic waste mixture, the one or more additives comprising pozzolans;
hot extruding the plastic waste mixture to form an extruded product comprising waste plastic material; and
processing the extruded product to form particles in which the waste plastic material is exposed at exterior surfaces thereof.

2. The method of claim 1, wherein the supply of plastic waste includes a variety of plastic materials including at least one of high density polyethylene, polypropylene, PVC, ABS, polyurethane, polyamide, and PET.

3. The method of claim 1, wherein the supply of plastic waste treated by the preconditioning agent includes at least about 50% waste plastic material by weight, and
wherein the supply of plastic waste includes at least some non-plastic material in the form of food residue, cellulosic material and/or metallic foil material.

4. The method of claim 1, wherein the supply of plastic waste is characterized by waste plastic having a granule size less than 25 mm obtained by shredding or pulverizing mixed plastic waste products, or
wherein the supply of plastic waste has a bulk density that is at least five times greater than a bulk density of mixed plastic waste products from which the plastic waste is derived.

5. The method of claim 1, wherein the supply of plastic waste treated by the preconditioning agent includes about 4% to about 22% calcium compounds by weight.

6. The method of claim 1, wherein prior to the mixing the supply of plastic waste treated with the preconditioning agent with the one or more additives, at least some calcium oxide of the preconditioning agent in the supply of plastic waste is converted to calcium hydroxide through exposure to moisture.

7. The method of claim 1, further comprising:
prior to the mixing the supply of plastic waste treated with the preconditioning agent with the one or more additives, blending the supply of plastic waste treated with the preconditioning agent with a supplemental supply of plastic waste from a different source.

8. The method of claim 1, wherein the pozzolans mixed with the plastic waste treated with the preconditioning agent comprises burned organic matter residues.

9. The method of claim 1, wherein the plastic waste mixture to be hot extruded includes about 2% to about 14% of pozzolans by weight, or
wherein the plastic waste mixture to be hot extruded includes about 6% to about 18% of calcium compounds by weight, or
wherein the plastic waste mixture to be hot extruded includes at least 50% plastic material by weight, or
wherein the plastic waste mixture is hot extruded at a processing temperature between about 165° C. and about 230° C.

10. The method of claim 1, wherein the one or more additives of the plastic waste mixture further comprises at least of an essence, a fire retardant, and an anti-bacterial agent.

11. The method of claim 1, wherein the plastic waste mixture has a moisture content sufficient to assist in forming cavities within the extruded product during the hot extruding of the plastic waste mixture.

12. The method of claim 1, wherein the plastic waste mixture to be hot extruded consists essentially of the plastic waste treated with the preconditioning agent and the pozzolans.

13. Particles formed by the process of:
obtaining a supply of plastic waste treated with a preconditioning agent that comprises at least one of calcium oxide and calcium hydroxide;
mixing the supply of plastic waste treated with the preconditioning agent with one or more additives to form a plastic waste mixture, the one or more additives comprising pozzolans;
hot extruding the plastic waste mixture to form an extruded product comprising waste plastic material; and
processing the extruded product to form particles in which the waste plastic material is exposed at exterior surfaces thereof.

14. A concrete product including particles formed by the process of claim 13.

15. Particles formed by the process of claim 13, wherein the process further comprises:
prior to the mixing the supply of plastic waste treated with the preconditioning agent with the one or more additives, blending the supply of plastic waste treated with the preconditioning agent with a supplemental supply of plastic waste from a different source.

16. Particles formed by the process of claim 13, wherein the plastic waste mixture to be hot extruded consists essentially of the plastic waste treated with the preconditioning agent and the pozzolans.

17. A method of making a concrete construction product, the method comprising:
obtaining particles formed by hot extruding a plastic waste mixture comprising comingled mixed plastics, a preconditioning agent that comprises at least one of calcium oxide and calcium hydroxide, and pozzolans, cooling the extruded product, and processing the extruded product to a desired size of particles;
mixing the particles with a cement mixture to form a concrete mixture;
mixing the concrete mixture with water to generate a concrete slurry; and
forming the concrete slurry into the concrete construction product.

18. The method of claim 17, wherein forming the concrete slurry into the concrete construction product includes forming the concrete slurry into a construction block.

19. The method of claim 17, wherein mixing the particles with the cement mixture includes replacing at least some of a volume of sand in the cement mixture with the particles.

20. The method of claim 17, wherein the desired size of the particles is similar to a size of sand particles for the cement mixture.

* * * * *